(12) United States Patent
Quintana et al.

(10) Patent No.: US 9,180,553 B2
(45) Date of Patent: Nov. 10, 2015

(54) ELECTRODE FOR GMAW HYBRID LASER ARC WELDING

(75) Inventors: Marie Annette Quintana, Twinsburg, OH (US); Vaidyanath Bharata Rajan, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 832 days.

(21) Appl. No.: 13/249,139

(22) Filed: Sep. 29, 2011

(65) Prior Publication Data

US 2013/0082036 A1    Apr. 4, 2013

(51) Int. Cl.
| | |
|---|---|
| *B23K 28/02* | (2014.01) |
| *B23K 9/00* | (2006.01) |
| *B23K 26/20* | (2014.01) |
| *B23K 35/30* | (2006.01) |
| *B23K 35/02* | (2006.01) |
| *B23K 35/40* | (2006.01) |
| *B23K 26/14* | (2014.01) |

(52) U.S. Cl.
CPC .............. *B23K 35/0261* (2013.01); *B23K 9/00* (2013.01); *B23K 26/1429* (2013.01); *B23K 26/20* (2013.01); *B23K 28/02* (2013.01); *B23K 35/30* (2013.01); *B23K 35/3053* (2013.01); *B23K 35/3073* (2013.01); *B23K 35/406* (2013.01)

(58) Field of Classification Search
CPC ........... B23K 35/3053; B23K 35/3073; B23K 35/406; B23K 28/02; B23K 35/0261; B23K 26/20; B23K 26/1429; B23K 26/00; B23K 35/22; B23K 35/30; B23K 9/00

USPC ............ 219/121.66, 146.1, 137 WM, 146.31, 219/121.64, 137 R; 75/302
See application file for complete search history.

(56) References Cited

U.S. PATENT DOCUMENTS

| | | | | |
|---|---|---|---|---|
| 1,350,317 | A * | 8/1920 | Kingsbury ..................... | 420/127 |
| 1,478,738 | A * | 12/1923 | Holslag ..................... | 219/146.23 |
| 1,905,247 | A * | 4/1933 | Scott ................................ | 420/72 |
| 2,481,010 | A * | 9/1949 | Gundelfinger .................. | 99/512 |
| 2,805,152 | A * | 9/1957 | Sherwin .......................... | 420/26 |
| 2,990,301 | A * | 6/1961 | Clemens, Jr. ................. | 428/563 |
| 3,114,033 | A * | 12/1963 | Elster et al. .............. | 219/146.41 |
| 3,453,142 | A * | 7/1969 | Dorschu et al. .............. | 428/389 |
| 3,573,426 | A * | 4/1971 | Blake et al. ........... | 219/137 WM |
| 3,902,039 | A * | 8/1975 | Lang .......................... | 219/146.1 |

(Continued)

FOREIGN PATENT DOCUMENTS

| | | | | |
|---|---|---|---|---|
| EP | 123027 A1 * | 10/1984 | ............ | B23K 35/30 |
| EP | 0123027 B1 * | 4/1987 | | |

(Continued)

OTHER PUBLICATIONS

International Search Report and Written Opinion in International Application No. PCT/IB2012/001903, mailing date Jan. 31, 2013.

(Continued)

*Primary Examiner* — Samuel M Heinrich
(74) *Attorney, Agent, or Firm* — Perkins Coie LLP

(57) ABSTRACT

A welding electrode hybrid laser arc welding is provided which is either a solid or metal core electrode. The electrode contains at least carbon, manganese, silicon, sulfur and phosphorus. The electrode has is no more than 0.02% carbon, manganese in the range of 0.6 to 1.2%, silicon in the range of 0.3 to 0.6%, no more than 0.01% sulfur, and no more than 0.01% phosphorus in % by weight of the electrode.

21 Claims, 1 Drawing Sheet

(56) References Cited

U.S. PATENT DOCUMENTS

| | | | | |
|---|---|---|---|---|
| 4,229,643 | A | * | 10/1980 | Caldwell .................. 219/146.24 |
| 4,245,145 | A | * | 1/1981 | Maniar et al. .............. 219/146.1 |
| 4,987,288 | A | * | 1/1991 | Yonker, Jr. ................ 219/146.1 |
| 6,124,569 | A | * | 9/2000 | Bonnet et al. ............. 219/146.1 |
| 6,242,113 | B1 | * | 6/2001 | Kiser .......................... 428/680 |
| 6,300,596 | B1 | * | 10/2001 | Bonnet et al. ......... 219/137 WM |
| 6,521,867 | B2 | * | 2/2003 | Bonnet et al. ......... 219/137 WM |
| 6,608,284 | B1 | * | 8/2003 | Nikodym ............... 219/137 WM |
| 2003/0178402 | A1 | * | 9/2003 | Nikodym ................... 219/146.1 |
| 2009/0017328 | A1 | * | 1/2009 | Katoh et al. ................ 428/653 |

FOREIGN PATENT DOCUMENTS

| | | |
|---|---|---|
| FR | 2955795 A1 | 8/2011 |
| JP | 11277291 | 10/1999 |
| JP | 2005219062 A | 8/2005 |
| WO | WO-0076718 A1 | 12/2000 |

OTHER PUBLICATIONS

AWS A5 Committee on Filler Metals and Allied Materials; Specification for Carbon Steel Electrodes and Rods for Gas Shielded Arc Welding; American National Standards Institute, Jun. 9, 2005; pp. i-iv and 1-34; American Welding Society; Miami, Florida 33126.

* cited by examiner

ELECTRODE FOR GMAW HYBRID LASER ARC WELDING

BACKGROUND OF THE INVENTION

1. Field of the Invention

Devices, systems, and methods consistent with the invention relate to electrodes used for GMAW hybrid laser arc welding.

2. Description of the Related Art

Recently, developments have been made in hybrid laser arc welding, where workpieces are welded using a combination of a laser and gas metal arc welding (GMAW) methods. In one example of such welding the laser is used to create, or at least initiate, the molten weld puddle and the GMAW process follows behind the laser to deposit the filler material—welding electrode—into the weld puddle. Because the GMAW process is typically done in accordance with well known GMAW processes, solid welding electrodes which conform with American Welding Society (AWS) Standards, for example A5.18 ER70S-3, are employed. However, when welding in a hybrid laser arc welding process the use of standard AWS electrodes can result in the creation of solidification cracks and increased weld hardness, which can degrade the integrity and quality of the weld.

BRIEF SUMMARY OF THE INVENTION

An exemplary embodiment of the present invention is an electrode for use in hybrid laser arc welding, and methods of making and using the electrode, having no more than 0.02% carbon, manganese in the range of 0.6 to 1.2%, silicon in the range of 0.3 to 0.6%, no more than 0.01% sulfur, and no more than 0.01% phosphorus in % by weight of the electrode.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
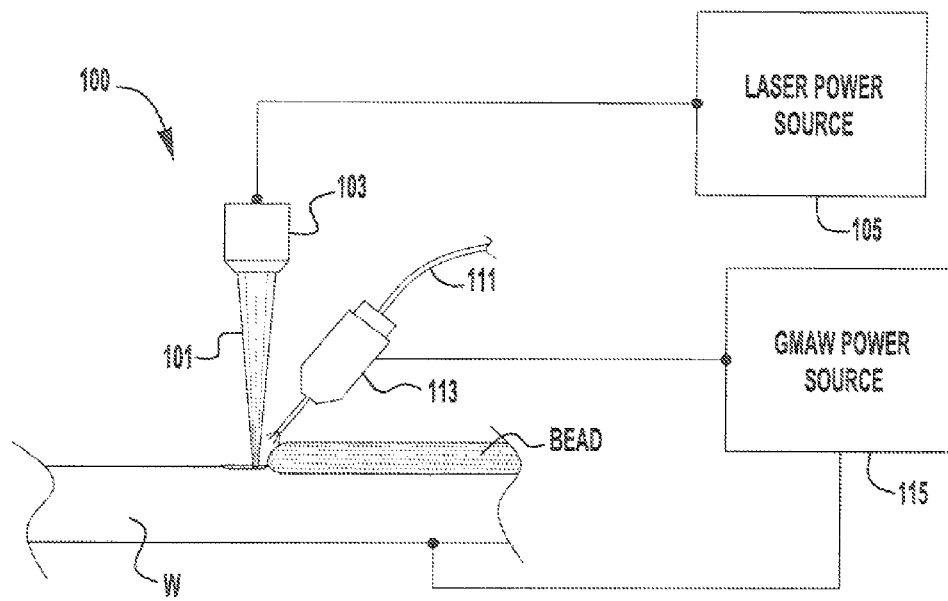
FIG. 1 illustrates a diagrammatical representation of a representative GMAW hybrid laser arc welding system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a basic representation of GMAW hybrid laser arc welding system 100. The system 100 includes a laser device 103 which projects a beam 101 at the workpiece W which starts to melt the workpiece. The laser device 103 is coupled to a laser power supply 105. A welding electrode 111 is delivered to the weld via a wire feeding device (not shown) and a contact tip 113. A GMAW power supply 115 provides a welding waveform to the electrode 111 so that the electrode can be deposited into the weld using a GMAW, or similar welding process. Because GMAW welding and GMAW hybrid laser arc welding is generally known the details of the welding process and the operation and structure of the respective components will not be discussed in detail herein. Although the following discussion references GMAW welding, aspects of the present invention are not limited for use in GMAW welding, but can also be used in similar welding operations having similar issues.

As stated previously, in typical hybrid laser arc welding operations a standard AWS A5.18 ER70S-3/-6 solid electrode is utilized. It has been discovered that the use of such standard electrodes in GMAW hybrid laser arc welding can lead to cracking and excessive weld hardness because of aspects of their chemical composition.

The AWS A5.18 electrode classification requires compliant electrodes to have specified amounts of certain elements in the composition of the wire. Specifically, AWS A5.18 requires the following (in % by weight of the electrode):

Carbon (C)=0.065 to 0.10%
Manganese (Mn)=1.05 to 1.35%
Silicon (Si)=0.50 to 0.65%
Sulfur (S)=no more than 0.03%
Phosphorus (P)=no more than 0.03%

For purposes of typical GMAW welding (as well as similar welding operations) the use of solid electrodes with such a composition results in an acceptable weld. However, when such electrodes are used in GMAW hybrid laser arc welding, the presence of carbon, manganese and silicon increase the freezing range of the weld metal. As such, the solidification of the weld puddle occurs over a wide temperature range. This causes the last liquid to freeze in the interdendritic region of the weld to have an increased concentration of these allowing elements (C, Si and Mn). This concentration causes the solidification temperature of this region to become even lower. Thus, when this occurs in a region of the weld joint having high stresses—such as would be experience in a weld joint having a high depth-to-width ratio—it can result in cracking in the weld. This can be referred to as solidification cracking. Furthermore, the cooling rates of the welds made with such electrodes can be high enough to cause the solidified weld to have high hardness microstructures. This can result in an overall weld having a high hardness, which can be disadvantageous depending on the application of the workpiece.

Embodiments of the present invention overcome or eliminate the above issues through the use of an electrode having a specified composition outside of the AWS A5.18 classification, which can be used in GMAW hybrid laser arc welding.

Specifically, an exemplary embodiment of a welding electrode in accordance with the present invention has the following components, in % by weight of the electrode:

Carbon (C)=no greater than 0.02%
Manganese (Mn)=0.6 to 1.2%
Silicon (Si)=0.3 to 0.6%
Sulfur (S)=no more than 0.01%
Phosphorus (P)=no more than 0.01%

In a further exemplary embodiment, the level of carbon is in the range of 0.005 and 0.015%. In another exemplary embodiment, the Mn is in the range of 0.6 to 0.9% and the Si is in the range of 0.3 to 0.45%. In a further exemplary embodiment, the amounts of sulfur and phosphorus are each in the range of 0.002 and 0.007%. Thus, another embodiment of the electrode can have the following percentages of the above components:

Carbon (C)=0.005 to 0.015%
Manganese (Mn)=0.6 to 0.90%
Silicon (Si)=0.3 to 0.45%
Sulfur (S)=no more than 0.002 to 0.007%
Phosphorus (P)=no more than 0.002 to 0.007%

Of course, various combinations of the above identified percentages can be utilized to optimize the performance of an electrode for a given welding operation. For example, the level of carbon can be in the range of 0.005 to 0.015% while the manganese is in the range of 0.6 to 1.2%. Similar exemplary combinations can be made. However, the relative percentages should be chosen to ensure a quality and acceptable weld. For example, the components should be chosen such that solidification cracking, weld hardness and porosity is minimized.

In various exemplary embodiments of the present invention with the above stated composition percentages, the performance of the weld metal during solidification of the weld is improved over the use of an AWS electrode, when employed in GMAW hybrid laser arc welding. By using such low levels of the above components the freezing range of the weld puddle is reduced. Further, even though the levels of the above components are reduced, they are sufficient to ensure that little porosity is created due to oxygen trying to escape from the weld. If the levels of some components are reduced too much, for example Si and Mn, oxygen bubbles can be created in the weld puddle which cause porosity as they try to escape the puddle. Furthermore, the above specification compositions prevent the formation of liquid films of iron sulfides, which can also cause cracking in the weld.

Figure 2:
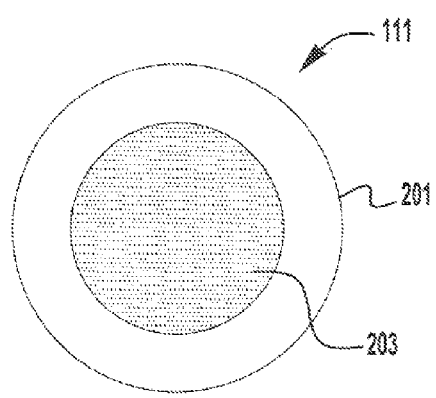
FIG. 2 illustrates a diagrammatical representation of a cross-section of a metal cored electrode in accordance with an exemplary embodiment of the present invention.

FIG. 2 depicts an exemplary embodiment of the present invention. The electrode 111 shown is a metal cored electrode having an outer sheath 201 and core 203. The outer sheath 201 can be made and formed in any known or conventional way, and can have a composition typically used in the manufacture of metal-cored electrodes. In some exemplary embodiments, all of the components identified above are found in the core 203, which is in a powder or granular form. That is, each of the carbon, manganese, silicon, sulfur and phosphorous are placed in the core 203. Other embodiments have at least some of the components identified above in the sheath 201 of the electrode. For example, in an exemplary embodiment at least one of the carbon, manganese, silicon, sulfur and phosphorus is in the sheath 201 of the electrode. In yet another exemplary embodiment, each of the sheath 201 and core 203 have amounts of at least some of the above identified components. For example, in an exemplary embodiment of the present invention, the sheath 201 can contain at least 25% of the components. That is, the sheath 201 can contain at least 25% of any one, or all, of the carbon, manganese, silicon, sulfur and phosphorous.

The sheath 201 represents the bulk of the weight of the electrode 111. In an exemplary embodiment, the core 203 represents 5 to 35% of the weight of the total weight of the electrode. In other exemplary embodiments the core 203 represents 10 to 25% by weight of the total weight of the electrode.

As stated previously, the present invention is not limited to a metal-cored wire as shown in FIG. 2, but can be made as a solid core electrode. However, an advantage of using a metal cored electrode is to allow for the relatively inexpensive adjustment of the electrode chemistry. This is because the chemistry adjustment can be primarily done through changes in the chemistry of the core materials, rather than in the raw material used to draw a solid core wire.

In exemplary embodiments of the present invention, the remainder of the weight percent of the electrode 11 can be made up of elements which typically appear in AWS A5.18 standard electrodes, including but not limited to: copper, iron, chromium, molybdenum, nickel, vanadium, etc. The respective amounts of these elements would be provided in amounts not to exceed the AWS standard requirements.

Because of the particular amounts of the above referenced elements, embodiments of the present invention can be used in GMAW hybrid laser arc welding without causing solidification cracking, and still achieve the weld strength and properties normally achievable through the use of ER70S electrodes—which have been typically used. Specifically, welds made with electrodes 111 made in accordance with the present invention can achieve strength levels of at least 58 ksi yield strength and at least 70 ksi tensile strength.

Electrodes made in accordance with exemplary embodiments of the present invention can be welded with typical shielding gas mixtures, including but not limited to 100% carbon dioxide or a mixture of argon and carbon dioxide.

Known manufacturing methods can be utilized to manufacture embodiments of the present invention. Specifically, for solid core electrodes a solid core electrode can be drawn from "green rod" having the appropriate chemistry, as set forth herein, to the appropriate diameter. Thus, a raw material or green rod is made having the desired chemistry as stated herein, and the raw material is then drawn—through known drawing or manufacturing processes—to the desired diameter and having any desired surface coatings. Such methods are known and need not be described herein. For metal-core embodiments, typically the sheath 201 is formed as a flat stock material of a desired width and thickness. The flat stock is then shaped in into a "U"-channel through a forming process. The core material is deposited into the U-channel and the U-channel is closed to form a circular sheath 201 which completely encloses the core 203 to hold the core material in place. Of course, other known or used manufacturing methods can be employed.

Embodiments of the present invention can be made in any of the known welding electrode diameters, or any other electrode diameter as needed for a welding operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding electrode for hybrid laser arc welding, comprising:
   an electrode body made up of a core and an outer sheath surrounding said core;
   wherein said electrode body core comprises carbon, manganese, silicon, sulfur and phosphorus, such that there is, in % by weight of the electrode body:
   no more than 0.02% carbon,
   manganese in the range of 0.6 to 1.2%,
   silicon in the range of 0.3 to 0.6%,
   no more than 0.01% sulfur, and
   no more than 0.01% phosphorus, and
   wherein said carbon, manganese, silicon, sulfur and phosphorus are in powder or granular form in said core.

2. The welding electrode of claim 1, wherein the carbon is in the range of 0.005 and 0.015% by weight of the electrode body.

3. The welding electrode of claim 1, wherein the manganese is in the range of 0.6 to 0.9% by weight of the electrode body.

4. The welding electrode of claim 1, wherein the silicon is in the range of 0.3 to 0.45% by weight of the electrode body.

5. The welding electrode of claim 1, wherein the sulfur is in the range of 0.002 to 0.007% by weight of the electrode body.

6. The welding electrode of claim 1, wherein the phosphorous is in the range of 0.002 to 0.007% by weight of the electrode body.

7. The welding electrode of claim 1, wherein said carbon is in the range of 0.005 and 0.015% by weight of the electrode body, and each of said sulfur and phosphorous is in the range of 0.002 to 0.007% by weight of the electrode body.

8. The welding electrode of claim 1, wherein said core is 5 to 35% of the weight of the electrode body.

9. The welding electrode of claim 1, wherein said core is 10 to 25% of the weight of the electrode body.

10. A method of making a welding electrode; comprising:
    forming an electrode body made up of a core and an outer sheath surrounding said core, said electrode body core having at least carbon, manganese, silicon, sulfur and phosphorous, where there is, in % by weight of the electrode body:
    no more than 0.02% carbon,
    manganese in the range of 0.6 to 1.2%,
    silicon in the range of 0.3 to 0.6%,
    no more than 0.01% sulfur, and
    no more than 0.01% phosphorus, and
    wherein said carbon, manganese, silicon, sulfur and phosphorus are in powder or granular form in said core.

11. The method of claim 10, wherein the carbon is in the range of 0.005 and 0.015% by weight of the electrode body.

12. The method of claim 10, wherein the manganese is in the range of 0.6 to 0.9% by weight of the electrode body.

13. The method of claim 10, wherein the silicon is in the range of 0.3 to 0.45% by weight of the electrode body.

14. The method of claim 10, wherein the sulfur is in the range of 0.002 to 0.007% by weight of the electrode body.

15. The method of claim 10, wherein the phosphorous is in the range of 0.002 to 0.007% by weight of the electrode body.

16. The method of claim 10, wherein said carbon is in the range of 0.005 and 0.015% by weight of the electrode body, and each of said sulfur and phosphorous is in the range of 0.002 to 0.007% by weight of the electrode body.

17. The method of claim 10, wherein said core is 5 to 35% of the weight of the electrode.

18. The method of claim 10, wherein said core is 10 to 25% of the weight of the electrode.

19. A method of welding, comprising:
    directing a laser beam to a work piece to melt at least a portion of said work piece;
    delivering a welding electrode made up of a core and an outer sheath surrounding said core to said work piece; and
    depositing said welding electrode in said melted portion using an arc welding process,
    wherein said welding electrode core comprises carbon, manganese, silicon, sulfur and phosphorus, such that there is, in % by weight of the electrode body:
    no more than 0.02% carbon,
    manganese in the range of 0.6 to 1.2%,
    silicon in the range of 0.3 to 0.6%,
    no more than 0.01% sulfur, and
    no more than 0.01% phosphorus, and
    wherein said carbon, manganese, silicon, sulfur and phosphorus are in powder or granular form in said core.

20. The method of welding of claim 19, wherein said carbon is in the range of 0.005 and 0.015% by weight of the welding electrode, and each of said sulfur and phosphorous is in the range of 0.002 to 0.007% by weight of the welding electrode.

21. A welding electrode for hybrid laser arc welding, comprising:
    an electrode body made up of a core and an outer sheath surrounding said core;
    wherein said core comprises carbon, manganese, silicon, sulfur and phosphorus, such that there is, in % by weight of the electrode body:
    no more than 0.02% carbon,
    manganese in the range of 0.6 to 1.2%,
    silicon in the range of 0.3 to 0.6%,
    no more than 0.01% sulfur, and
    no more than 0.01% phosphorus,
    wherein said carbon, manganese, silicon, sulfur and phosphorus are in powder or granular form in said core, and wherein said electrode body comprises no more than 0.15% chromium.

* * * * *